March 21, 1961 W. V. BUNCH 2,975,999
PORTABLE LANTERN STAND
Filed July 30, 1958

INVENTOR.
Walter V. Bunch
BY
Townsend and Townsend
attorneys

United States Patent Office 2,975,999
Patented Mar. 21, 1961

2,975,999
PORTABLE LANTERN STAND
Walter V. Bunch, 1338 Bruce St., Chico, Calif.
Filed July 30, 1958, Ser. No. 751,973
1 Claim. (Cl. 248—121)

This invention relates to a portable lantern stand.

Generally it is desirable to hang lanterns from trees or other overhanging elements adjacent a camp site in order to place the lantern in an elevated position so as to effect an even distribution of light throughout the camping area. In some areas, however, the trees are either not located in a convenient spot with respect to the camp site or as in desert areas where trees are completely absent. It has therefore been found that some means for hanging a lantern is a useful adjunct to camping equipment.

A principal object of this invention is to provide such a lantern hanging means in the form of a novel stand which can be readily assembled to form a rigid lantern support and which may be conveniently disassembled into a small compact package.

A feature and advantage of this invention is the provision of means whereby the various legs of the lantern stand may be firmly anchored into the ground so as to hold the stand firmly against wind or other forces which might upset it.

A still further feature and advantage of this invention is the provision whereby the parts may in the disassembled condition be arranged so as to occupy a minimum of space.

Other objects of the present invention will become apparent upon reading the following specification and referring to the accompanying drawings in which similar characters of reference represent corresponding parts in each of the several views.

Figure 1:
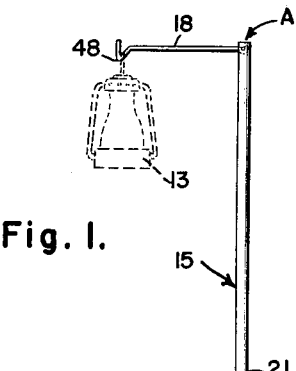
Fig. 1 is an elevational view of a principal embodiment of the invention shown in the assembled condition.
Figure 2:
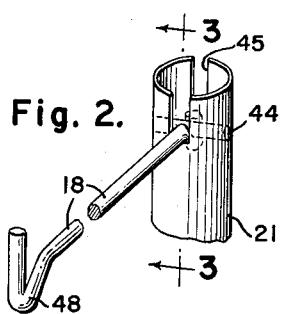
Fig. 2 is a perspective view of the lantern mounting arm of the invention.
Figure 3:
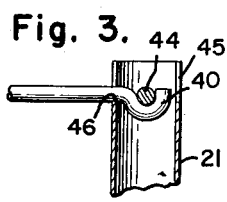
Fig. 3 is a cross-sectional view of the portion of the device shown in Fig. 1.
Figure 4:
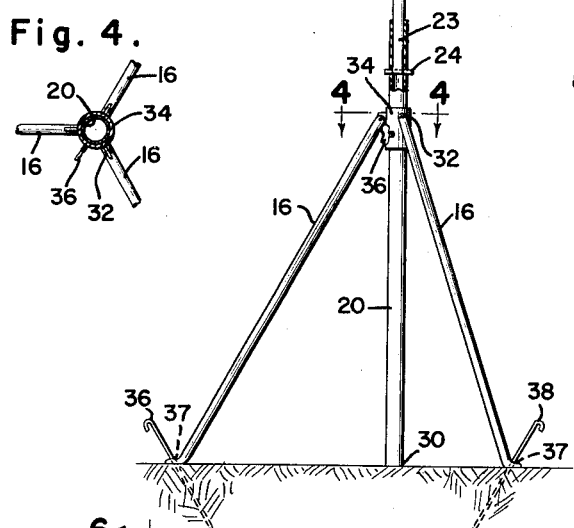
Fig. 4 is a fragmentary cross-sectional view of Fig. 1 taken at line 4—4.
Figure 5:
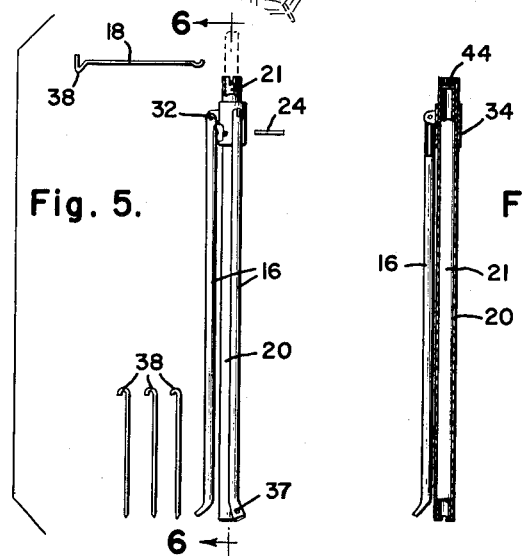
Fig. 5 is a view of the various components of the invention shown in broken down condition.
Figure 6:
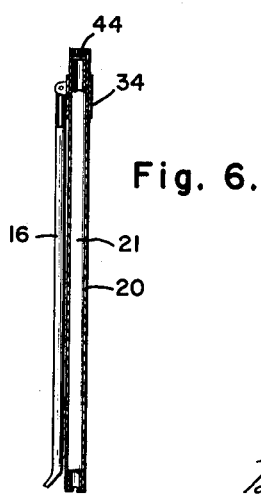
Fig. 6 is a view of the folded legs and pole assembly broken away to show the inner structure thereof.

Referring now to the drawings there is provided in the principal embodiment of the invention a lantern stand A which is formed by a pole 15 supported by legs 16 and having mounted thereon a lantern carrying arm 18 from which a lantern B depends.

Pole 15 is formed in two parts consisting of a bottom conduit or pipe 20 into which a top conduit 21 is telescopically nested as indicated at 23. A pin 24 is inserted within conduit 20 to form a stop upon which conduit 21 is arranged to rest.

Bottom of conduit 20 rests directly on the ground as indicated at 30 and pole 15 is supported by legs 16 which form a tripod mounted at equally spaced points 32 on a sleeve 34. Sleeve 34 is slidably mounted on exterior conduit 20 and is locked by a set screw 36. The bottom of each of the legs 16 is flanged outwardly to form an apertured top 37 through which stakes or pins 38 are inserted into the ground so as to firmly and securely lock the legs against movement. By this means stand A is firmly and securely supported.

Arm 18 is formed on one end with a hook portion 40 and is arranged to engage pin 44 mounted transversely across a bifurcated tip portion 45 of top section 21 of pole 15. Hook 40 is arranged to pivotally nest under axle pin 44 and rest on the bottom ledge 46 which forms a stop to prevent arm 18 from moving downward beyond the horizontal edge. The outer end 48 of arm 18 is formed with a hook on which lantern B can be mounted. The outer end 48 also forms a weighted bias to urge the arm downwardly thus maintainnig hook 40 in engagement with pin 44.

In operation it will be noted that pin 24 is removable. Thus with pin 24 removed pipe or conduit 21 is enabled to be telescopically mounted completely within the interior of conduit 20 and arm 18 is removable from its mounted position with respect to the top portion of conduit 21. Screw 36 can be looseend and the sleeve slid towards the upper end of conduit 20 whereat leg 16 may be folded to a position juxtaposed conduit 20. The various other small components such as pins 38, arm 18 and pin 24 may be packaged in a small container while the larger components of the device are held in a substantially parallel compact configuration.

To assemble the device sleeve 34 is adjusted to its proper position with respect to conduit 20 whereat legs 16 depend at the desired angle and conduit 20 is arranged in a substantially vertical position whereinafter pins 38 are driven through the apertures in the top 36 of the legs 16 to rapidly mount the device. Thereafter conduit 21 is pulled to its upper position and pin 24 is installed. Arm 18 is then installed by placing it within the bifurcation 45 of conduit 21 and rotates the arm to a downward position whereat the arm rests upon bottom 46 of the bifurcated end. The device is then in a position to install lantern B on outer end 48.

It is believed obvious that the device can be used for other applications such as for example the support of a clothes line or radio antenna.

Although the foregoing invention has been described in some detail by way of illustration and example for purposes of clarity of understanding, it is understood that certain changes and modifications may be practiced within the spirit of the invention as limited only by the scope of the appended claim.

What is claimed is:

In a lantern stand of the type including a hollow vertical conduit and a stand to support said conduit in a vertical position the combination of: a slot cut in the upper end of the conduit and being open ended at the top of said conduit; a pin mounted in said conduit normal to the wall carrying the slot; said pin mounted at approximately the elevation of the bottom of said slot; and a lantern mounting arm having an upwardly facing cup formed on one end; said arm mounted on said conduit with the upwardly facing cup mounted under said pin and a section of said arm mounted on the bottom edge of said slot; said arm being mountable and demountable from and into engagement with said conduit through the open ended slot in the top portion of said conduit.

References Cited in the file of this patent

UNITED STATES PATENTS

| | | |
|---|---|---|
| 424,569 | Morrison | Apr. 1, 1890 |
| 836,321 | Hill | Nov. 20, 1906 |
| 1,198,008 | Clive | Sept. 12, 1916 |
| 1,525,701 | Rose et al. | Feb. 10, 1925 |
| 1,854,393 | Berg | Apr. 19, 1932 |
| 1,863,442 | Goodman | June 14, 1932 |